United States Patent [19]
Ehmann

[11] Patent Number: 6,002,088
[45] Date of Patent: Dec. 14, 1999

[54] CABLE OR LINE GUIDING DEVICE

[75] Inventor: Bruno Ehmann, Mögglingen, Germany

[73] Assignee: Murplastik System-Technik GmbH, Germany

[21] Appl. No.: 09/231,457

[22] Filed: Jan. 14, 1999

Related U.S. Application Data

[63] Continuation of application No. PCT/EP97/03806, Jul. 16, 1997.

[51] Int. Cl.[6] .................................................. H02G 3/18
[52] U.S. Cl. ................................. 174/65 G; 174/152 G; 174/153 G
[58] Field of Search ............................... 174/65 R, 65 G, 174/152 G, 153 G, 151, 135; 248/56; 16/2.1, 2.2

[56] References Cited

U.S. PATENT DOCUMENTS 4,797,513  1/1989  Ono et al. ............................... 174/153

FOREIGN PATENT DOCUMENTS

| | | |
|---|---|---|
| 3326551 | 2/1985 | Germany . |
| 3446503 | 8/1985 | Germany . |
| 3544785 | 6/1987 | Germany . |
| 9100004 | 5/1991 | Germany . |
| 4300521 | 7/1994 | Germany . |
| 4434202 | 9/1995 | Germany . |
| 4441478 | 5/1998 | Germany . |

*Primary Examiner*—Dean A. Reichard
*Attorney, Agent, or Firm*—Schweitzer Cornman Gross & Bondell LLP

[57] ABSTRACT

A device for guiding cables or lines through walls, having a body having two mating parts, means for connecting the body to a wall surface, at least one passage through said body, the passage having an inlet and an outlet with the latter adapted to face a wall, a member at least partially substantially tightly disposed within the inlet, the member having a stress relief portion which can contact the circumference of a cable within the member.

20 Claims, 4 Drawing Sheets

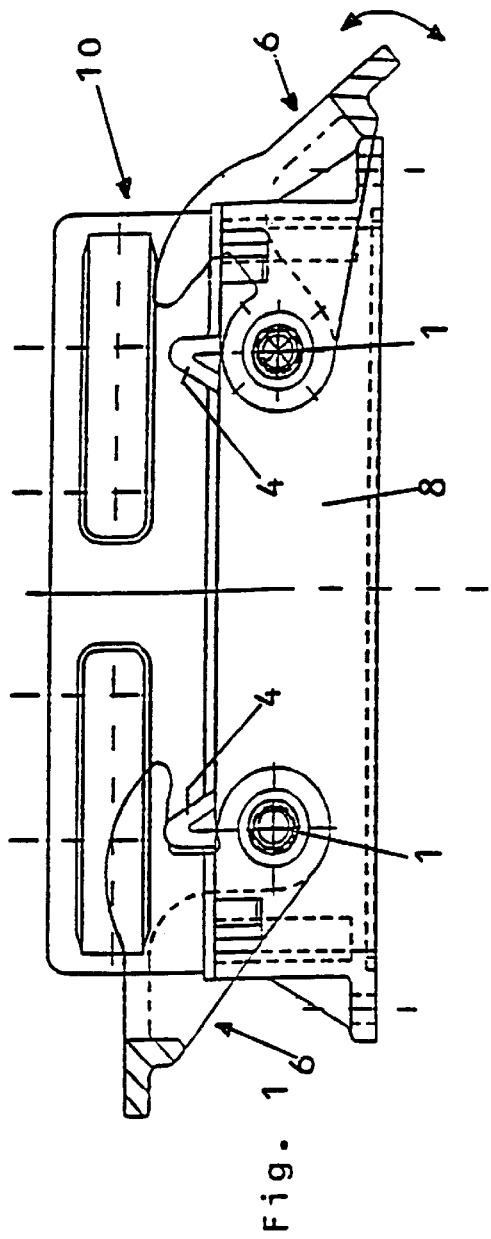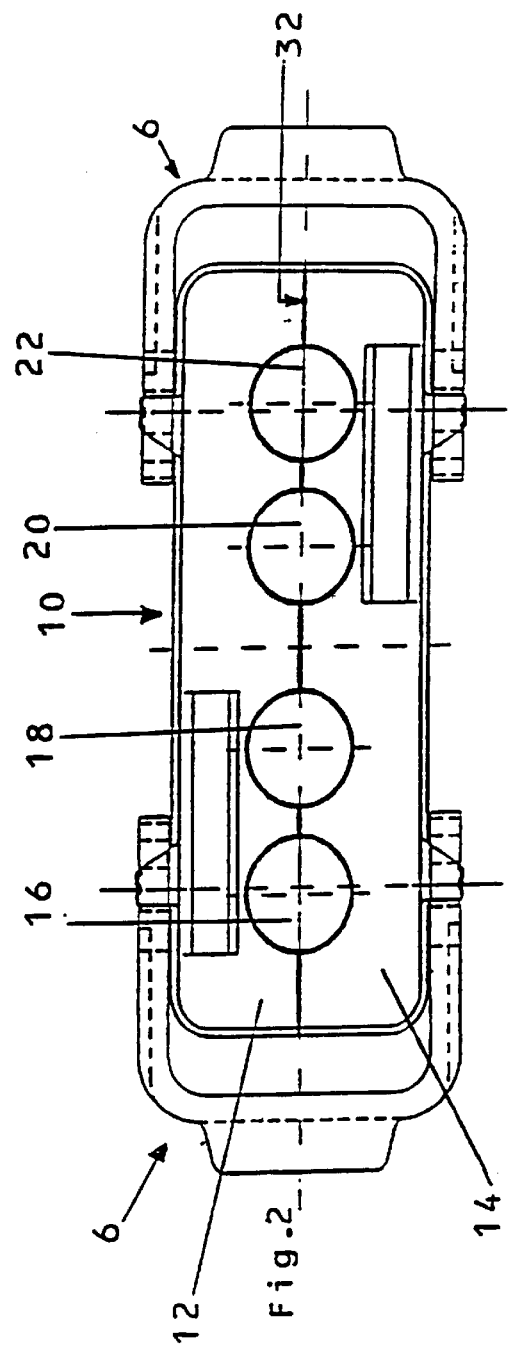

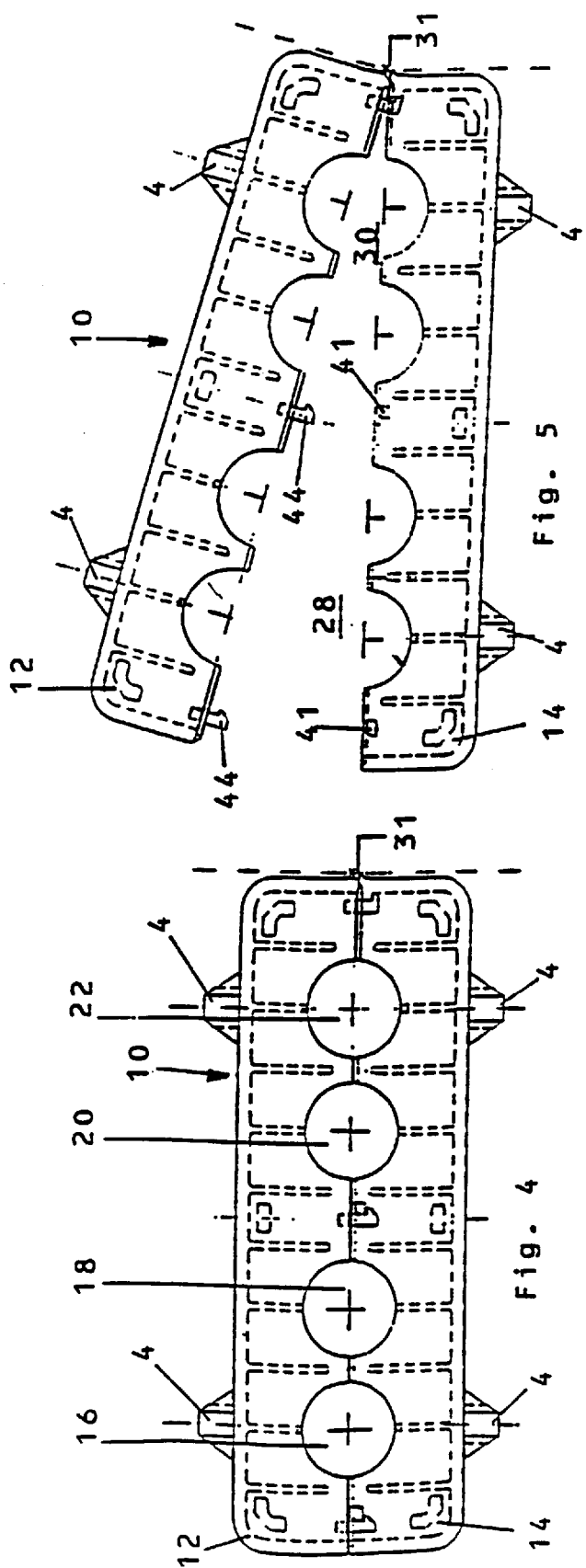

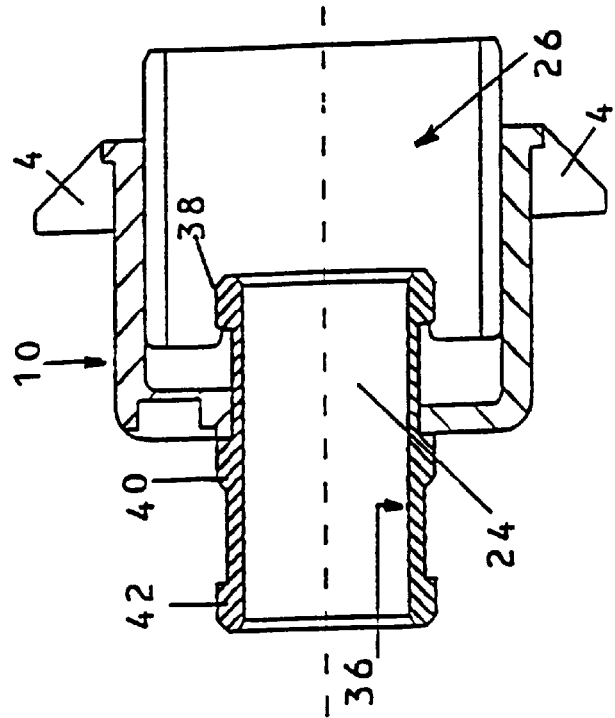
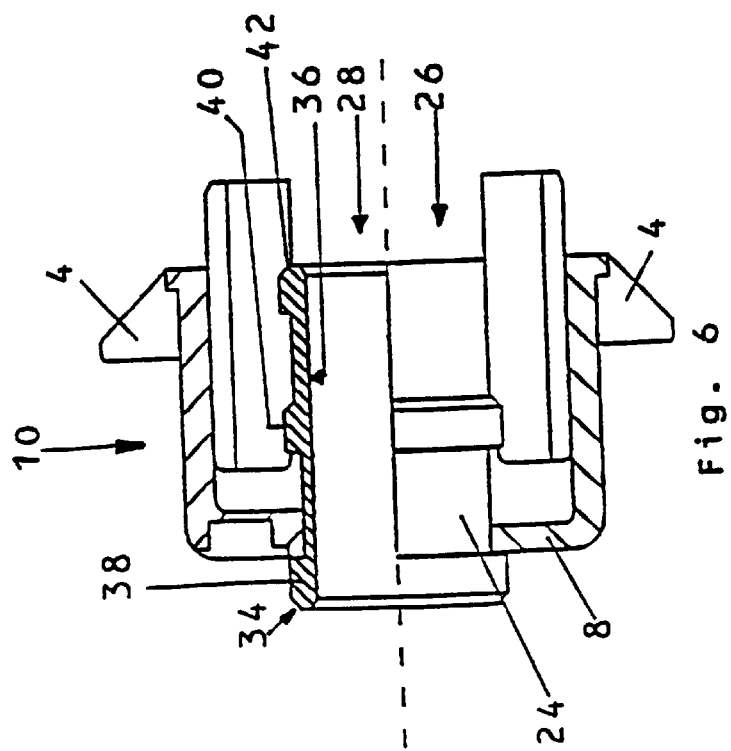

CABLE OR LINE GUIDING DEVICE

This is a continuation of international application PCT/EP97/03806, filed on Jul. 16, 1997.

FIELD OF INVENTION

The invention relates to a device for guiding cables and lines.

BACKGROUND

In conventional devices of such cable and lines guides, as described, for example, in German patent No. 3,544,785 A1, and used in motor vehicle bodies, the guide has two thin-walled, plastic half shells, the interior of which is filled with a rubber-elastic containment body with appropriate openings for the cables and lines. The desired frictional connection between the half shells and the containment body is achieved by connecting the shell segments by snap fasteners. A simple and operative connection between the individual parts is, however, achieved only if the internal diameter of the cable openings is only slightly smaller than the external diameter of the cables contained therein. In all other cases either there is no tight connection between the contained cable and the containment body with an appropriate stress relief (diameter of the cable is smaller than the diameter of the opening), or the shell segments cannot be readily fastened together, because the diameter of the cable is clearly larger than the diameter of the corresponding opening. In such cases, it is possible to select soft rubber, however, at the expense of providing stress relief which is of decisive importance for control boxes.

In European patent No. 430,046, a device for sealing a hole is disclosed, which is mounted in the wall of the control box and through which a cable is to be passed. The device has cast iron housing parts and its interior is filled with compressible foamed blocks of rubber. Hose clamps for fastening the cable are attached to the inside of one of the two housing parts by screws which can be screwed into a cross member and transversely to the length of the cables. The housing parts can be connected by screws. It is a disadvantage of this device that a proper connection of the cables with the assigned hose clamps is not only cumbersome, but also time-consuming, especially when several devices are to be disposed in a very tight space or if the device is intended for a plurality of cables and/or lines.

BRIEF SUMMARY OF THE INVENTION

The present invention is a device for guiding cables or lines through walls, comprising a body having two mating parts, means for connecting the body to a wall surface, at least one passage through said body, the passage having an inlet and an outlet with the latter adapted to face a wall, a member at least partially substantially tightly disposed within the inlet part of said passage, the member having a stress relief portion which can contact the circumference of a cable within the member.

In a particularly suitable embodiment of the invention a member fills up the free space between the cable and the inlet part and has at least one collar, and is supported at the outer and inner sides of the inlet part. This simply enables a connection which cannot be shifted and is assured between the member and the parts even when the member is of a relatively soft, of a well sealing material.

A further suitable embodiment of the present invention provides that the stress relief has a projection which extends toward the cable, surrounds the cable by about 180° and is disposed completely in the cavity. Advisably the projection is disposed at a distance from the inner walls of the cavity.

A rapid connection of the parts is enabled in a suitable embodiment of the invention by detachably connecting the parts with one another by click-lock devices. The elastically deformable click-lock devices are suitably integrally molded with the parts.

In a further suitable embodiment of the present invention, the parts are connected by a film hinge. This simplifies the manufacture and the connecting of the parts, and the parts remain connected to one another so that they cannot be lost. The body faces the wall and has centering projections for exact positioning of the device on the wall. Centering projections are suitably provided that can be positively connected with centering openings of the wall or of an adapter.

BRIEF DESCRIPTION OF THE DRAWINGS

An embodiment of the invention is diagrammatically shown in the drawing and explained in greater detail in the following. In the drawing, FIG. 1 is a side elevational view of the device;

FIG. 2 is a front elevational view of the device;

FIG. 4 shows the device of FIG. 3 when closed;

FIG. 5 shows the device of FIG. 3 when open about a film hinge;

FIG. 6 is a cross-sectional view of the device with a stress relief member therein; and FIG. 7 shows the device of FIG. 6, with the stress relief member outside of the body.

DETAILED DESCRIPTION

Figure 3:
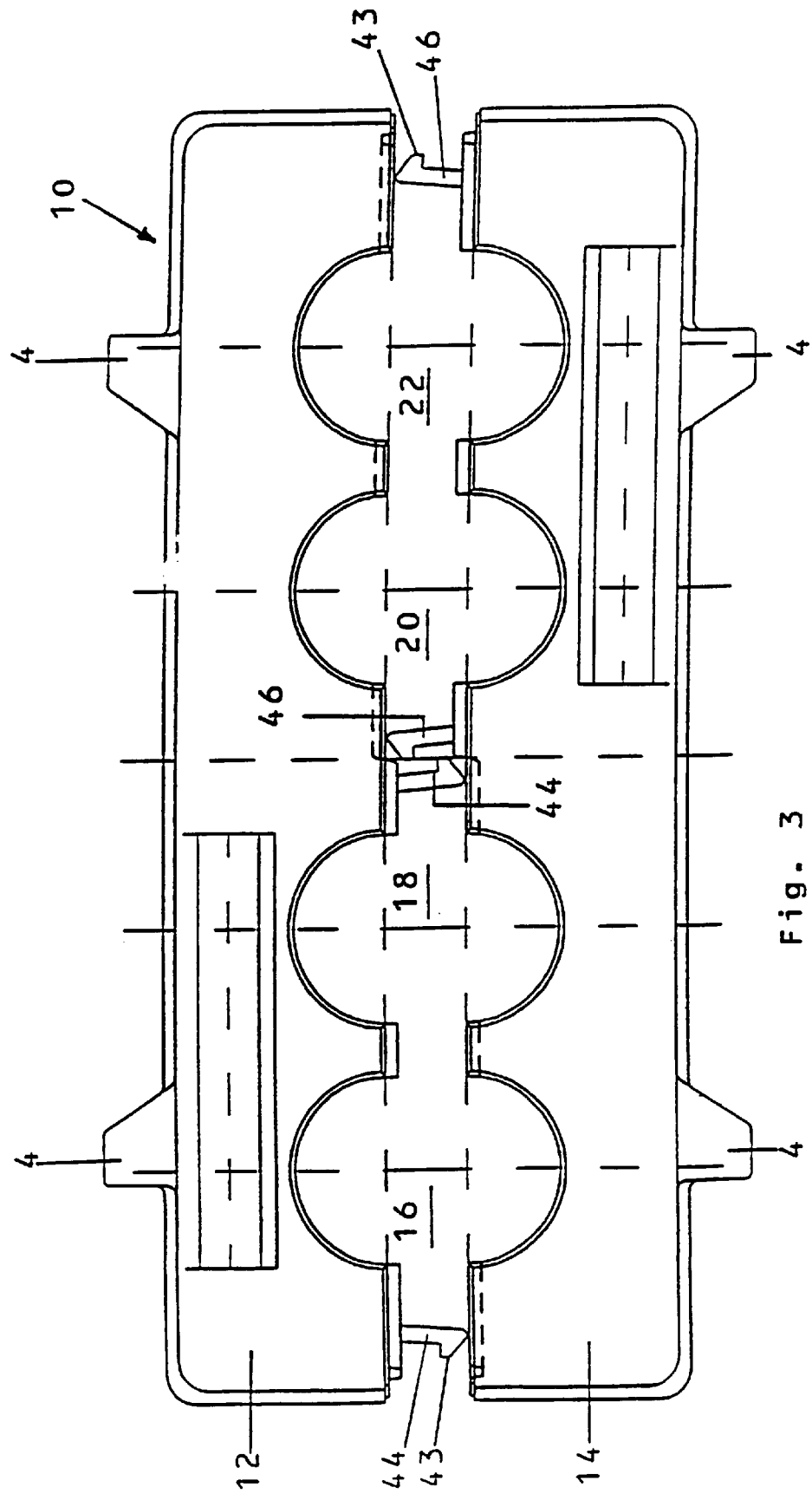
FIG. 3 is an exploded front view of the device.

The figures show a device or a part of a device for guiding cables or lines through walls, floors or the like, with a body 10 containing interior cavities 28, 30 (FIG. 5). The body has two parts 12, 14 that can be connected to a wall (not shown). The parts of the body 10 define four openings 16, 18, 20, 22 in the front 8 of the body, with inlet and outlet parts 24, 26 (FIGS. 6 and 7). The openings are connected to the interior cavities 28, 30. The inlet parts 24 are averted from the wall and the openings 16 to 22 are traversed by a separation 32. It can be seen that, in the inlet part 24 (FIGS. 6 and 7), an adjustable and compressible member 34, which can sufficiently tightly contain the cable therein upon the compression thereof by body parts 12 and 14 against axial slippage. The body 10 is disposed in a fixed position with a stress relief area 36, which protrudes into the cavity 28 and can be connected with the cable. The member 34 is of an elastically deformable material, such as rubber or plastic, and fills the free space between the cable and the inlet part 24. The member 34 has two collars 38, 40, which are respectively supported outside and inside of the inlet part 24 (see FIG. 6).

The distance between the collars 38, 40 should approximately correspond to the wall thickness of the body 10 in the region of the inlet part 24. The collars 38, 40 form a tight, pressure connection with the outer walls of the inlet part 24. As shown in FIGS. 6 and 7, the stress relief 36 has a projection 42, which extends in the direction of the cable and has a cable binder (not shown). The projection 42 surrounds the cable by about 180° and is disposed entirely in the cavity 28 (FIG. 6) or outside of the cavity 28 (FIG. 7). The projection 42 is disposed at a distance from the inner walls of the cavity 28, as a result of which the manipulation with the cable binder can be simplified. The cable binder can be a plastic or metallic rope which assures further compressive locking of the cable against axial displacement and more intimate contact with the member 34.

The parts 12, 14 can be detachably connected by click-locks 44, 46, which are suitably integrally molded to the parts 12, 14. The click-locks 44, 46 are suitably hook shaped and have an engaging nose 43, which engages the recesses 41 in the respective other part.

As shown in FIGS. 4 and 5, the parts 12, 14 can be connected to one another by a film hinge 31, while the embodiment of FIG. 3 has no film hinge. It is a common feature that the parts 12, 14 have two lateral projections 4, the function of which is to be engaged by a connector member 7, which has two swivelable levers 6 which, in the operative state of the device connect the body 10 to a wall (not shown). The levers 6 can be swiveled about the axes 1 in the direction of the double arrow (FIG. 1). The outlet opening 26 of the body 10 faces the wall and the cavity 28 suitably has a square cross-section (FIGS. 6 and 7) and is open toward the wall. The inlet part 24 is formed in the front wall 8. Suitably the body 10 has centering members (not shown) directed toward the wall, that engage centering openings in the wall or in an adapter for accurate interconnection. Suitably the parts 12 and 14 have identical shapes, so that only a single injection mold is required for their production.

The device of the present invention has a body for guiding cables or lines through walls, the body having parts 12, 14, at least one opening 16–20, which are separated by the separation 32, and has inlet and outlet parts 24, 26 which can be operatively connected with a member 34 sufficiently tightly and without tension connecting the cable with the body 10, and contains the cavity 28, which is open toward the wall. The parts 12, 14 can be connected with one another by the click-lock devices 44, 46. The parts 12, 14 can be tightly connected with one another in the region of the separation 32 and, suitably by using a sealing gasket (not shown). The member 34 is shown best in FIGS. 6 and 7, and is a socket with three collars 38, 40, 42. The collars 38 and 40 produce a tight and immovable connection with the front wall 8 of the body 10. The collar 42, together with the stress relief area 36, can be entirely disposed in the cavity 28 (FIG. 6), or outside of the body 10 (FIG. 7).

The device of the present invention can be used in practice so that the lines or cables are manufactured with the member 34. They are then placed and centered in the openings 16, 18, 20, 22 (FIG. 5). The upper part 12 is then swiveled toward the part 14, with the click-locks 44 producing an operative connection between the parts 12, 14. Finally the body 10 is connected with the connector member 7, as shown in FIGS. 1 and 2.

The embodiments shown in FIGS. 4 and 5 have the advantage that the parts 12, 14 can remain connected with one another, so that they cannot be lost, while the totally separable parts of the embodiment of FIG. 3 has the advantage, that all openings 16–22 are immediately accessible.

I claim:

1. A device for guiding cables or lines through walls, comprising a body having two mating parts, means for connecting said body to a wall surface, at least one passage through at least one said body, said passage having an inlet and an outlet with the latter adapted to face a wall, a member at least partially substantially tightly disposed within said inlet, said member having a stress relief portion which can contact the circumference of a cable within said member, and at least one collar supported outside the inlet.

2. The device of claim 1, wherein said outlet is adapted to face a wall when attached thereto.

3. The device of claim 1, said body further comprising a front wall and a rear side, and an interior cavity having a substantially square cross-section, said inlet being formed in said front wall, and said rear side with said outlet is open.

4. The device of claim 1, wherein said member is of an elastically deformable material.

5. The device of claim 1, wherein said member has two collars, the distance between said collars approximately corresponding to a thickness of said body at the inlet.

6. The device of claim 1, wherein said member has two collars, said inlet has outer walls, and said collars are in a substantially tight pressure connection with the outer walls of the inlet.

7. The device of claim 1 wherein said member substantially fills any free space between a cable and said inlet.

8. The device of claim 1, wherein said stress relief portion has a projection, said projection being adapted to surround about 180° of a cable within the device, and said projection is disposed entirely within said at least one passage.

9. The device of claim 1, wherein said at least one passage has inner walls, and said projection is disposed spaced from said inner walls.

10. The device of claim 1, further comprising click lock means for connecting or disconnecting said two or from mating parts to one another.

11. The device of claim 10, wherein said click lock means comprise integrally molded portions of said mating parts.

12. The device of claim 10, wherein said mating parts when mated are separated from each other by a separation, and said click lock means of at least one of said mating parts crosses said separation.

13. The device of claim 12, wherein said mating parts are tightly mated with each other through said click lock means.

14. The device of claim 10, wherein said click lock means comprises a movable extension in one of said mating parts, said extension having a nose engageable with the edge of an opening in an opposed surface of the other of said mating parts.

15. The device of claim 14, wherein each of said mating parts has at least one said movable extension, and each of said movable extensions is opposed by an engageable opening in the opposed one of said mating parts.

16. The device of claim 11, wherein said integrally molded portions comprise an elastically deformable extension swingable in one of said mating parts, said extension having a nose swingably engageable with an edge of an opening in an opposed surface of the other of said mating parts.

17. The device of claim 16, wherein each of said mating parts has at least one said movable extension, and each of said movable extensions is opposed by an engageable opening in the opposed one of said mating parts.

18. The device of claim 16, wherein said mating parts are of substantially identical shape.

19. The device of claim 1, further comprising a film hinge for hingably connecting said mating parts to one another.

20. A device for guiding cables or lines through walls, comprising a body having two mating parts, means for connecting said body to a wall surface, at least one passage through said at least one body, said passage having an inlet and an outlet with the latter adapted to face a wall, said body further comprising a front wall and a rear side, and an interior cavity having a substantially square cross-section, said inlet being formed in said front wall, and said rear side with said outlet is open, the device further comprising a member at least partially substantially tightly disposed within said inlet, said member having a stress relief portion which can contact the circumference of a cable within said member.

* * * * *